United States Patent [19]

Yoshizaki et al.

[11] Patent Number: 5,573,731
[45] Date of Patent: Nov. 12, 1996

[54] ELECTRICALLY HEATED CATALYTIC CONVERTER FOR AN ENGINE

[75] Inventors: Kouji Yoshizaki, Numazu; Masahiko Ogai, Toyota; Takuzou Kako, Tokyo; Yuuji Nakajima, Kimitsu; Kenji Fujino, Kimitsu; Kazunori Itoh, Kimitsu; Shohgo Konya, Kawasaki; Keiji Sato, Futtsu, all of Japan

[73] Assignees: Toyota Jidosha Kabushiki Kaisha, Aichi; Nippon Steel Corporation, Tokyo, both of Japan

[21] Appl. No.: 449,325

[22] Filed: May 24, 1995

[30] Foreign Application Priority Data

May 30, 1994 [JP] Japan .................................. 6-116674
Feb. 14, 1995 [JP] Japan .................................. 7-025457

[51] Int. Cl.$^6$ ..................................... F01N 3/28
[52] U.S. Cl. .................. 422/174; 422/180; 422/199; 422/222; 60/300; 428/593; 428/594; 228/121; 228/124.5
[58] Field of Search ............. 422/173,174, 180, 422/199, 222; 60/300; 55/DIG. 30; 502/439, 527; 228/124.5, 121, 219; 428/593, 594

[56] References Cited

U.S. PATENT DOCUMENTS

| | | | |
|---|---|---|---|
| 3,770,389 | 10/1973 | Kitzner et al. | 422/174 |
| 4,901,904 | 2/1990 | Tsuno | 228/124.5 |
| 5,070,694 | 12/1991 | Whittenberger | 60/300 |
| 5,084,361 | 1/1992 | Toyoda et al. | 428/593 |
| 5,094,074 | 3/1992 | Nishizawa et al. | 60/300 |
| 5,174,968 | 12/1992 | Whittenberger | 422/174 |
| 5,316,997 | 5/1994 | Toyoda et al. | 428/593 |

FOREIGN PATENT DOCUMENTS

| | | |
|---|---|---|
| 0 490 222 | 6/1992 | European Pat. Off. . |
| 0 590 171 | 4/1994 | European Pat. Off. . |
| 43 06 482 | 9/1993 | Germany . |
| 4281851A | 10/1992 | Japan . |
| 5-288036 | 2/1993 | Japan . |
| 5171928A | 7/1993 | Japan . |
| 5179939A | 7/1993 | Japan . |
| 6-71184 | 3/1994 | Japan . |
| WO9218245 | 10/1992 | WIPO . |

*Primary Examiner*—Robert J. Warden
*Assistant Examiner*—Hien Tran
*Attorney, Agent, or Firm*—Kenyon & Kenyon

[57] ABSTRACT

The electrically heated catalytic converter of the present invention includes a catalyst substrate, which is formed as a scroll-like cylindrical laminated assembly. The assembly is formed by laminating a thin corrugated and plain metal sheets and winding the metal sheets together around a center electrode. The outermost layer of the laminated assembly is connected to an outer electrode. The corrugated metal sheet has an insulating coating made of an alumina, and the plain metal sheet is uninsulated. Local conductive connections form between the thin metal sheets by soldering strips of zirconium solder foils between the layers of the thin metal sheets. Since zirconium has a larger reducing capability than aluminum, the alumina in the insulating coating is reduced by zirconium and precipitates at the local conductive connections. Therefore, the plain and corrugated metal sheet are electrically connected to each other at the local conductive connections. The solder foils in the respective layers are arranged in a configuration where a strip of solder foil in one layer overlaps with strips of solder foils in adjoining layers only at its ends, and does not overlap with strips of solder foils in the adjacent layers when viewed radially. Since the solder foils overlap only by a small area, electric current flowing through the local conductive connections concentrates in the overlap area and produces hot spots. The overall resistance of the electric paths can be adjusted by varying the solder strip length.

6 Claims, 13 Drawing Sheets

EXHAUST GAS

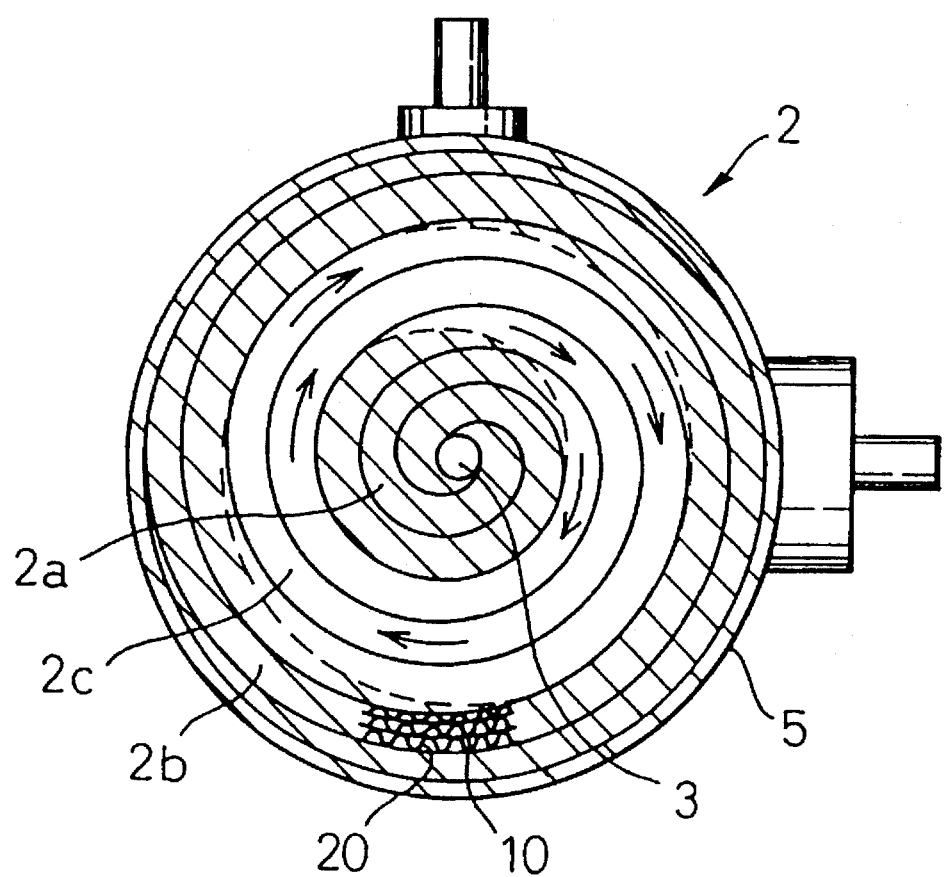

ELECTRICALLY HEATED CATALYTIC CONVERTER FOR AN ENGINE

BACKGROUND OF THE INVENTION

1. Field of the Invention

The present invention relates to an electrically heated catalytic converter having a substrate for a catalyst formed as a laminated assembly of thin metal sheets.

2. Description of the Related Art

Exhaust gas purification devices that utilize three-way reducing and oxidizing catalytic converters disposed in the exhaust passage of an internal combustion engine are commonly used. Generally, the catalyst used in such converters purifies the pollutants in the exhaust gas only when the temperature of the catalyst exceeds a certain temperature, i.e., the catalysts in the converter do not work when the temperature of the catalyst is below an activating temperature.

Usually, once the engine starts, the catalyst in the converter is gradually heated by the exhaust gas of the engine and reaches the activating temperature. However, when the temperature of the engine is low, such as during a cold start, it takes a substantially amount of time to heat up the catalyst to the activating temperature, since the heat of the exhaust gas is absorbed by the cold walls of the exhaust passage before reaching the converter. Therefore, during a cold start of the engine, the exhaust gas from the engine is not sufficiently purified since the temperature of the catalyst is below the activating temperature.

To solve this problem, electrically heated catalytic converters are used to shorten the time required for the catalyst to reach the activating temperature. Usually, electrically heated catalytic converters have metal substrates, and the catalysts are heated during engine start by an electric current fed through the metal substrates, i.e., by using the metal substrates as electric heaters.

An electrically heated catalytic converter of this type, for example, is disclosed in Japanese Unexamined Patent Publication (Kokai) No. 5-179939. The electrically heated catalytic converter disclosed in JPP'939 has a substrate formed as a scroll-like cylindrical laminated assembly of thin metal sheets.

More specifically, as shown in FIG. 16, the substrate in JPP'939 comprises a thin plain metal sheet 10 and a thin corrugated metal sheet 20 both provided with insulating coatings on the surfaces. The plain metal sheet 10 and the corrugated metal sheet 20 are placed one upon another and wound around a common center electrode 3 so that the plain metal sheet 10 and the corrugated metal sheet 20 form a scroll-like cylinder 2 of laminated metal sheets. The outer surface of the scroll-like laminated assembly 2 is connected to an outer electrode 5. In the layers 2a near the center electrode 3 and in the layers 2b near the outer electrode 5 of the laminated assembly, the crests of the corrugated metal sheet are soldered to the plain metal sheet in such a manner that electric currents can flow through the soldered parts. On the other hand, the corrugated metal sheet 20 and the plain metal sheet 10 are not soldered in the intermediate layers 2c between these soldered layers 2a and 2b, therefore, the plain metal sheet 10 and the corrugated metal sheet 20 are electrically isolated by the insulating coatings. Namely, in the substrate of the catalytic converter of JPP'939, conductive connections which connect the plain metal sheet and corrugated metal sheet of the respective layers are formed in the region 2a near the center electrode 3 and in the region 2b near the outer electrode 5, and between these regions, the plain metal sheets 10 and corrugated metal sheet 20 in the respective layers are electrically isolated each other.

After the scroll-like laminated assembly of the metal sheets is formed, a three-way reducing and oxidizing catalyst, of a known type, is attached to the surfaces of the thin metal sheets in each layer of the laminated assembly.

When an electric voltage is imposed between the electrodes 3 and 5, electric current flows in a radial direction in the region 2a near the center electrode and in the region 2b near the outer electrode through the conductive connections between the plain metal sheets 10 and the corrugated metal sheets 20. In the intermediate region 2c, the electric current flows only through the metal sheets, since the plain metal sheet 10 and the corrugated metal sheet 20 are electrically isolated by insulating coatings.

This means that in the regions 2a and 2b, radial electric paths having shorter lengths and larger cross sections are formed. On the other hand, a spiral electric path through the metal sheets (indicated by arrows in FIG. 16) which has a longer path length and smaller cross section is formed in the intermediate region 2c.

Therefore, when electricity is fed to the laminated assembly, the intermediate region 2c, which has a larger resistance than the regions 2a and 2b, generates a large amount of heat and reaches high temperatures. Thus, a spiral shaped electric heater of the thin metal sheets 10 and 20 is formed in the intermediate region 2c of the substrate.

When the intermediate region 2c of the substrate reaches the activating temperature (for example, 300° to 400° C.), an oxidation reaction, with the unburned HC and CO components in the exhaust gas, starts, and, once the reaction starts, the entire substrate is heated up rapidly by the heat generated by the oxidation reaction.

However, in the electrically heated catalytic converter in JPP'939, electric current flows uniformly through the metal sheets in the intermediate region. This means that, when electricity is fed to the converter, the entire volume of the cylinder formed by the metal sheets in the intermediate region 2c is uniformly heated by the electric current. Since the volume of the metal sheets in the intermediate region is relatively large, the total heat mass of the metal sheets in the intermediate region 2c is also relatively large. Therefore, a relatively long time is required to heat the metal sheets in this region up to the activating temperature of the catalyst.

In the electrically heated catalytic converter of JPP'939, it is possible to heat up the entire volume of the metal sheets in a short time by feeding a larger electric current. However, it is not practical to feed a large electric current to the converter during a starting operation of the engine since it increases the load on the battery and the alternator of the engine and may lead to a failure to start the engine or to wear of the battery.

To solve the above problems, electric paths connecting the center electrode and the outer electrode can be formed by local conductive connections between the thin metal sheets. In this case, small conductive connections of the respective layers are arranged in a predetermined pattern so that they form electric paths of narrow cross section which extend from the center electrode to the outer electrode in radial directions. Therefore, electric current flows through narrow electric paths formed by small conductive connections instead of flowing through the thin metal sheets. Since the electric current is concentrated in the small conductive connections instead of flowing through the cross section of the metal sheets uniformly, the conductive connections are heated rapidly without requiring a large amount of electricity.

When the conductive connections reach the activating temperature, the oxidation reaction, with the unburned HC and CO components, starts at the local conductive connections and, once the reaction starts, the heat generated by the oxidation reaction at the local conductive connections is conveyed to the rest of the substrate, and other portions also reach the activating temperature, thus the oxidation reaction starts in the entire substrate in a short time. Namely, when electricity is fed to the laminated assembly, the local conductive connections become heat spots which act as starters of the oxidation reaction in the catalytic converter.

Therefore, if the number of heat spots (i.e., the number of the local conductive connections) is large the time required for the catalytic converter to start the oxidation reaction becomes shorter. However, when the number of the local conductive connections are large, the total amount of electric current flowing through the local conductive connections also becomes large, and the failure in the starting operation of the engine and the wear of the battery may occur.

On the other hand, if the number of the local conductive connections are small, structural strength of the laminated assembly is lowered, since the thin metal sheets in the laminated assembly are joined only by the local conductive connections.

Therefore, it is difficult to optimize the number and size of the local conductive connections in such a manner that the oxidation reaction of the catalytic converter starts in a short time with relatively small amount of electric current while maintaining the structural strength of the laminated assembly.

SUMMARY OF THE INVENTION

In view of the problems set forth above, the object of the present invention is to provide an electrically heated catalytic converter for an engine which can be rapidly heated up to the activating temperature of the catalyst without requiring large electric current during starting of the engine and without reducing the structural strength of the substrate for the catalyst.

This object of the invention is achieved by the electrically heated catalytic converter of the present invention, in which electric current flows through very narrow electric paths formed by small local conductive connections between the metal sheets in the respective layers arranged in a predetermined pattern.

According to one aspect of the present invention, there is provided an electrically heated catalytic converter for an engine comprising, a substrate supporting a three-way reducing and oxidizing catalyst, the substrate being formed as a laminated assembly of a plurality of thin metal sheets, a pair of electrodes, one each connected to the metal sheets in both end layers of the laminated assembly, thin insulating layers, each interposed between the respective layers of the thin metal sheets, the insulating layers being made of an oxide of a first metal, and local conductive connections electrically connecting the thin metal sheets of the respective layers, the local conductive connections being formed by soldering the thin metal sheets through the insulating layer using strips of solder foils which are made of a soldering material containing a second metal component having larger reducing capability than the first metal, wherein the strips of the solder foils are arranged in such a manner that the solder foils in the respective layers overlap with at least a solder foil in one of the adjoining layers by only a portion thereof when viewed from a direction perpendicular to said thin metal sheets.

At the portions where the thin metal sheets of the adjoining layers are soldered by the strips of solder foils, the oxide of the first metal in the insulating layers is reduced by the second metal in the solder foils, thereby the first metal component in the insulating layers precipitates at the soldered portions. Therefore, at the soldered portions, the thin metal sheets in the adjoining layers are connected mechanically and electrically, thus the local conductive connections are formed. Since the strips of the solder foils in the adjoining layers overlap each other by only a portion of the strips, the areas of the overlapped portions are small relative to the total area of the local conductive connections. When electricity is fed to the laminated assembly, electricity flows from one layer to another through the small overlapped areas of the local conductive connections. Since, electricity concentrates in the small overlapped areas, these overlapped portions are heated up rapidly and act as heat spots. Further, since the thin metal sheets are joined each other by the entire area of the local conductive connections, the structural strength of the laminated assembly can be maintained while increasing the number of the heat spots.

Further, according to another aspect of the present invention, the strips of the solder foils are arranged in such a manner that the solder foils in the respective layers overlap with the solder foils in the adjoining layers at end portions of the strip and in such a manner that the solder foils in the respective layers and the solder foils in layers next to the adjoining layers are separated by a predetermined clearance, viewed from the direction perpendicular to the thin metal sheets. By this arrangement of the strips of the solder foils, any heat spots in successive three layers are not aligned in the direction perpendicular to the thin metal sheets. Therefore, electricity always flows through the thin metal sheets between the heat spots. Thus, the lengths of the electric paths, i.e., the resistance of the electric paths becomes larger, thereby an increase in the amount of the electric current is prevented without reducing the area of the junctions between the thin metal sheets.

Further, according to another aspect of the present invention, the respective strips of the solder foils are arranged in such a manner that the widths of the strips are narrower at the portions where they overlap the strips in the adjoining layers than the width of other portions of the strips. Therefore, the resistance of the electric paths are further increased due to the decrease in the areas of the heat spots, and the increase of the amount of electric currents can be prevented without decreasing the area of junctions between the thin metal sheets.

According to another aspect of the present invention, there is provided an electrically heated catalytic converter for an engine comprising, a substrate supporting a three-way reducing and oxidizing catalyst, the substrate being formed as a laminated assembly of a plurality of thin metal sheets, a pair of electrodes, one each connected to the metal sheets in both end layers of the laminated assembly, thin insulating layers, each interposed between the respective layers of the thin metal sheets, inlet side local conductive connections formed in an exhaust gas inlet portion of the laminated assembly which electrically connects the thin metal sheets of the respective layers through the insulating layers, and outlet side local conductive connections formed in an exhaust gas outlet portion of the laminated assembly which electrically connecting thin metal sheets of the layers through the insulating layers, wherein the outlet side local conductive connections are disposed in such a manner that the distances between the outlet side local conductive connections along the direction perpendicular to the thin metal sheets are larger than the distances between the inlet local conductive connections along the direction perpendicular to the thin metal sheets.

Since the outlet side local conductive connections are disposed at larger intervals in the direction perpendicular to the thin metal sheets than the inlet side local conductive connections, the electric paths formed by the outlet side local conductive connections have larger resistances than the electric paths formed by the inlet side local conductive connections. Therefore, the amount of electricity flowing through the laminated assembly does not increase substantially at the outlet side local conductive connections while the structural strength of the laminated assembly largely increases after the outlet side local conductive connections are formed.

According to another aspect of the present invention, there is provided an electrically heated catalytic converter for an engine comprising, a substrate supporting a three-way reducing and oxidizing catalyst, the substrate being formed as a laminated assembly of thin insulated metal sheets having insulating coatings on their surfaces and thin raw metal sheets having raw metal surfaces alternately, a pair of electrodes, one each connected to the metal sheets in both end layers of the laminated assembly, and local conductive connections electrically connecting the insulated metal sheets and adjoining raw metal sheets, wherein each of the local conductive connections is formed by a small piece of raw metal sheet fitting into an aperture formed on the insulated metal sheet, and solder foils joining the bare metal surfaces of the bare metal surfaces of said piece of the raw metal sheet and the bare metal surfaces of the raw metal sheets in adjoining layers. Since the local conductive connections are formed by joining the raw metal surfaces without interposing the insulating layers between the surfaces, the junction strength of the conductive connections increases. Therefore, the overall structural strength of the laminated assembly is further increased.

BRIEF DESCRIPTION OF THE DRAWINGS

The present invention will be better understood from the description as set forth hereinafter, with reference to the accompanying drawings, in which:

FIG. 16 is a drawing showing electric paths formed in the laminated assembly in the related art.

DESCRIPTION OF THE PREFERRED EMBODIMENTS

Figure 1:
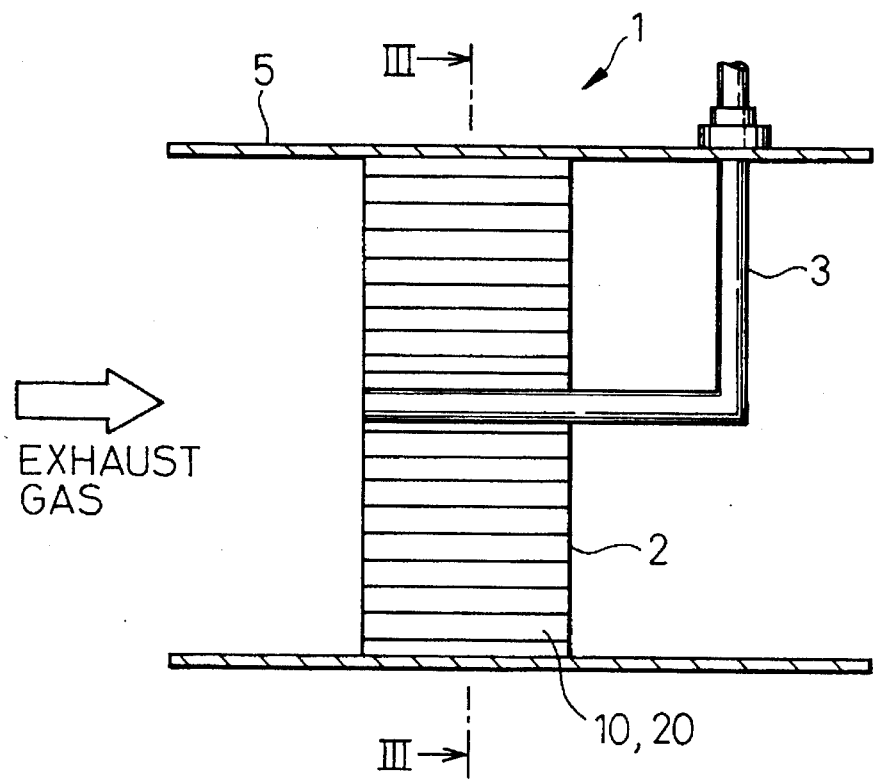
FIG. 1 is a sectional view illustrating the general construction of the electrically heated catalytic converter.

In the embodiments explained hereinafter, the present invention is applied to an electrically heated catalytic converter of the scroll-like cylindrical laminated assembly type, in which a corrugated metal sheet and a plain metal sheet are placed one upon another and wound around a center electrode so that the metal sheets are laminated in the shape of a scroll-like cylinder.

Therefore, before explaining the respective embodiments, the construction of the electrically heated catalytic converter of a scroll-like cylindrical laminated assembly type used in these embodiments is explained with reference to FIGS. 1 through 3. In the explanations of the respective embodiments, reference numerals which are the same as those in FIGS. 1 through 3 designate the same elements as those shown in FIGS. 1 through 3.

FIG. 1 is a typical sectional view of an electrically heated catalytic converter of the scroll-like cylindrical laminated assembly type used in the embodiments of the present invention. In FIG. 1, reference numeral 1 designates an electrically heated catalytic converter as a whole. Numeral 2 is a substrate formed as a cylindrical laminated assembly of the metal sheets. Numerals 10 and 20, respectively, designate the plain metal sheet and corrugated metal sheet which constitute the cylindrical laminated assembly 2. Numeral 3 is a center electrode disposed at the center of the cylindrical laminated assembly 2. The center electrode 3 is a metal rod type electrode connected to both the plain metal sheet 10 and the corrugated metal sheet 20 and acts as a positive electrode. The cylindrical laminated assembly 2 is contained in a metal casing 5. The outer surface of the cylindrical laminated assembly 2 is connected to the inner surface of the casing 5, and the casing 5 acts as a negative outer electrode. Therefore, when a voltage is imposed across the center electrode 3 and the casing 5, an electric current flows through the plain metal sheet 10 and the corrugated metal sheet 20.

Figure 2:
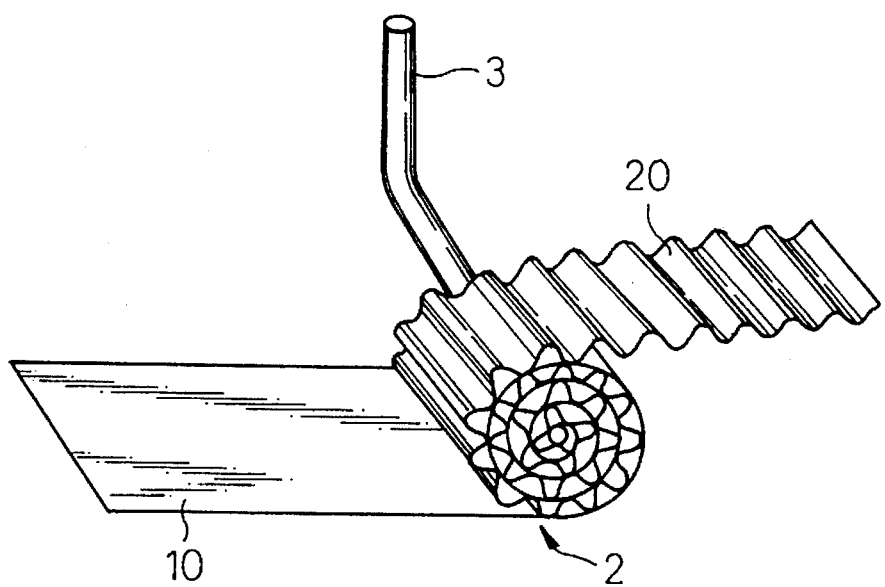
FIG. 2 is a drawing illustrating the construction of the laminated assembly of the electrically heated catalytic converter.
Figure 3:
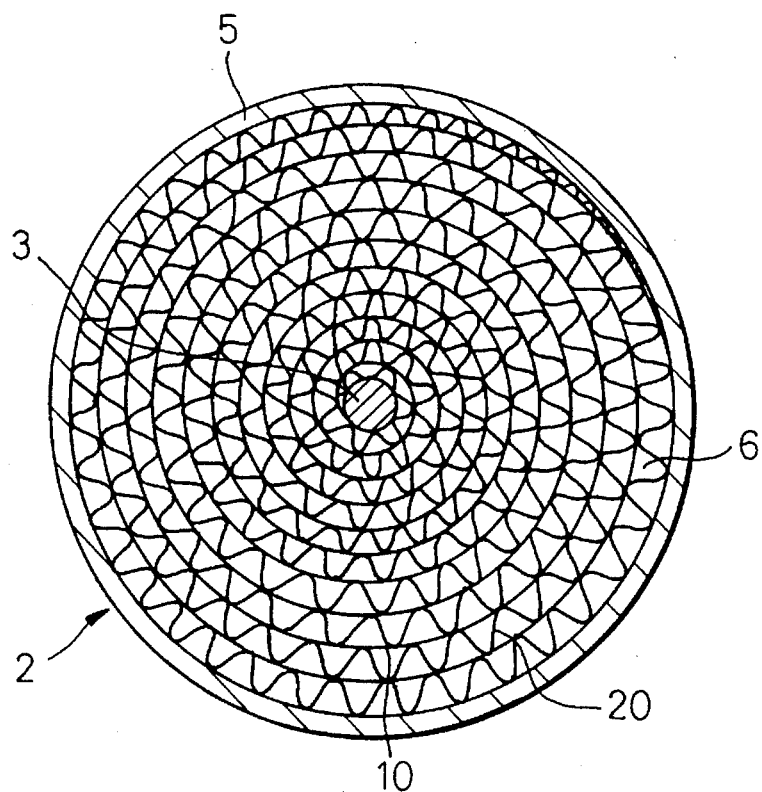
FIG. 3 is a drawing showing a sectional view taken along the line III—III in FIG. 1.

FIGS. 2 and 3 illustrate the construction of the cylindrical laminated assembly 2 of FIG. 1. As shown in FIG. 2, the cylindrical laminated assembly 2 is formed by placing the belt shaped plain metal sheet 10 and the corrugated metal sheet 20 one upon another, and attaching the center electrode 3 to the edges of the metal sheets 10 and 20, then winding the laminated metal sheets 10 and 20 around the center electrode 3.

FIG. 3 shows a sectional view of the cylindrical laminated assembly 2 taken along the line III—III in FIG. 1. Since the plain metal sheet 10 and corrugated metal sheet 20 are laminated, and wound around the center electrode 3, a number of axial passages 6 are formed between the crests of the corrugated metal sheet and the plain metal sheet and are arranged spirally in the laminated assembly 2.

As explained later, a catalyst is attached to the surface of the metal sheets 10 and 20. When the casing 5 of the converter 1 is connected to an exhaust passage of the internal combustion engine, the exhaust gas flows through the axial passages 6, and the pollutants in the exhaust gas react due to the catalyst attached to the walls of the passages 6.

Both the plain metal sheet 10 and the corrugated metal sheet 20 are made of a ferrous alloy containing aluminum (such as 75% Fe-20% Cr-5% Al alloy) and are approximately 50 microns thick. An electrically insulating coating of a metal oxide (such as aluminum oxide (alumina, $Al_2O_3$) about 1 micron thick is formed on the surface of the metal sheets 10 and 20. In the embodiments of the present invention, the insulating coating of $Al_2O_3$ is formed on at least one of the metal sheets 10 and 20, or both, prior to the assembly of the cylindrical laminated assembly. However, since the insulating coating of $Al_2O_3$ is also used as a carrier for the particles of the catalyst, if a raw metal sheet (i.e., metal sheet having no insulating coating) is used to form the laminated assembly 2, the whole laminated assembly 2 is baked in an oxidation atmosphere after the assembly, to produce an $Al_2O_3$ layer on the surface of the metal sheets 10 and 20. The catalyst components, such as platinum Pt, rhodium Rh, and palladium Pd are impregnated in the $Al_2O_3$ layer after the assembly of the laminated assembly 2 is completed.

In the electrically heated catalytic converter of the present invention, very narrow electric paths are formed in the laminated assembly 2 by local conductive connections where the thin metal sheets of the respective layers are joined by solder foils as explained later. When electricity is fed to the laminated assembly 2, electric currents concentrate in the narrow electric paths formed by the local conductive connections instead of flowing through the cross section of the metal sheets uniformly. Thus, only the portion of the metal sheets around the local conductive connections, instead of the entire metal sheets, are heated by the electric currents flowing through the electric paths, and are heated up rapidly.

When the local temperature of these portions reach the activating temperature of the catalyst approximately 300° to 400° C.), the oxidation reaction of the HC and CO components of the exhaust gas starts immediately due to the catalyst, and the heat generated by the reaction is conducted, through the metal sheets, to heat up the entire laminated assembly 2. Therefore, the temperature of the entire laminated assembly 2 rises rapidly, and reaches the activating temperature of the catalyst a short time after electricity is fed to the converter 1.

Further, since the cross sections of the conductive connections can be kept small, the resistances of the electric paths connecting the electrodes can be kept high. Therefore, the total amount of the electric current becomes small while the electric current flowing through the electric paths are kept relatively high.

However, in this construction, the thin metal sheets of the laminated assembly are mechanically joined only at the local conductive connections. Therefore, it is necessary to form a relatively large number of the local conductive connections to obtain sufficient structural strength of the laminated assembly as a whole. On the other hand, if the number of the local conductive connections is increased, the resistance of the electric paths connecting the electrodes becomes smaller, and the amount of electric current increases, thus the load on the battery increases. Therefore, it is difficult to obtain an appropriate resistance of the electric path while maintaining the structural strength of the laminated assembly.

The embodiments explained hereinafter provide laminated assemblies in which the resistances of the electric paths are adjusted in an appropriate range while the structural strength of the laminated assembly is maintained.

FIGS. 4 through 8, 9A and 9B illustrate an embodiment of the present invention. In this embodiment, the corrugated metal sheet 20 is formed as an insulated metal sheet which has insulating coatings of alumina ($Al_2O_3$) on its surfaces, and the plain metal sheet 10 is formed as a raw metal sheet which has bare surfaces. The plain metal sheet 10 and the corrugated metal sheet 20 are laminated and wound around the center electrode 3 as shown in FIG. 2, to form the scroll-like cylindrical laminated assembly 2. The radial local conductive connections are formed by soldering the crests of the corrugated metal sheet 20 to the plain metal sheet 10 of the adjacent layers in such a manner that the plain metal sheet 10 and the corrugated metal sheet 20 connect each other electrically through the insulating coating of the corrugated metal sheet 20. The electric paths connecting the center electrode 3 and the outer electrode 4 are formed by these local conductive connections.

Figure 4:
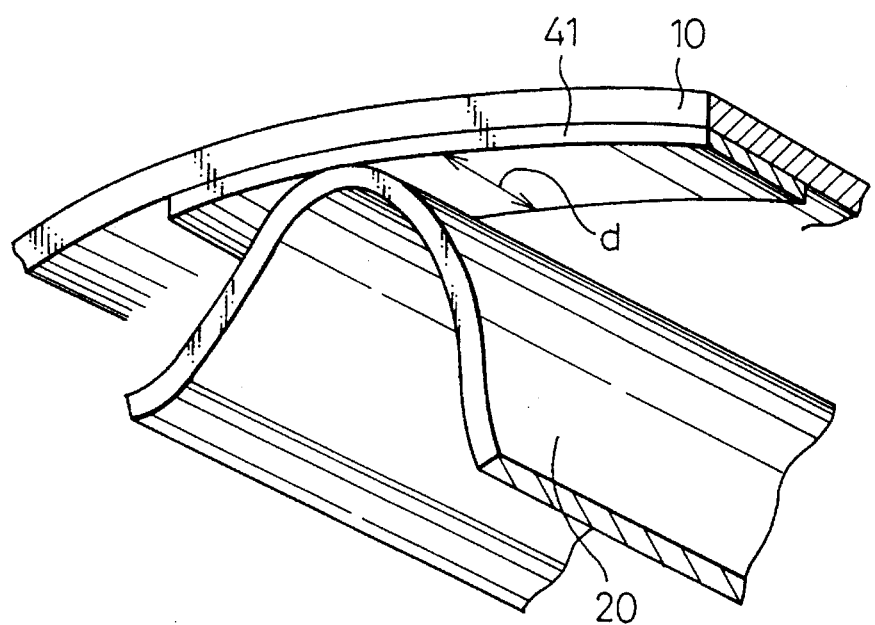
FIG. 4 is a drawing showing an enlarged view of a local conductive connection formed between a raw metal sheet and an insulated metal sheet.

FIG. 4 shows the constructions of the local conductive connections of the present embodiment. In this embodiment, when the metal sheets 10 and 20 are laminated, strips of solder foils 41 having a predetermined width d are interposed between the plain metal sheet 10 and corrugated metal sheet 20 at the portions where the conductive connections are to be formed. The solder foils 41 are made of soldering material which contains a metal component, such as zirconium Zr, having higher reducing capability than the metal oxide forming the insulating coating (in this embodiment, alumina $Al_2O_3$). After forming the laminated assembly 2, the whole assembly 2 is heated, for example, in a furnace to join the plain metal sheet 10 and the corrugated metal sheet 20 by soldering. When the solder foil 41 melts, the zirconium component in the solder foil forms zirconium oxide by taking oxygen away from alumina $Al_2O_3$. Therefore, aluminum, which acts as conductor connecting the plain metal sheet 10 and the corrugated metal sheet 20, precipitates within the insulating coatings at the soldered portions. Thus, the local conductive connections are formed between the plain metal sheet 10 and the corrugated metal sheet 20.

Figure 5:
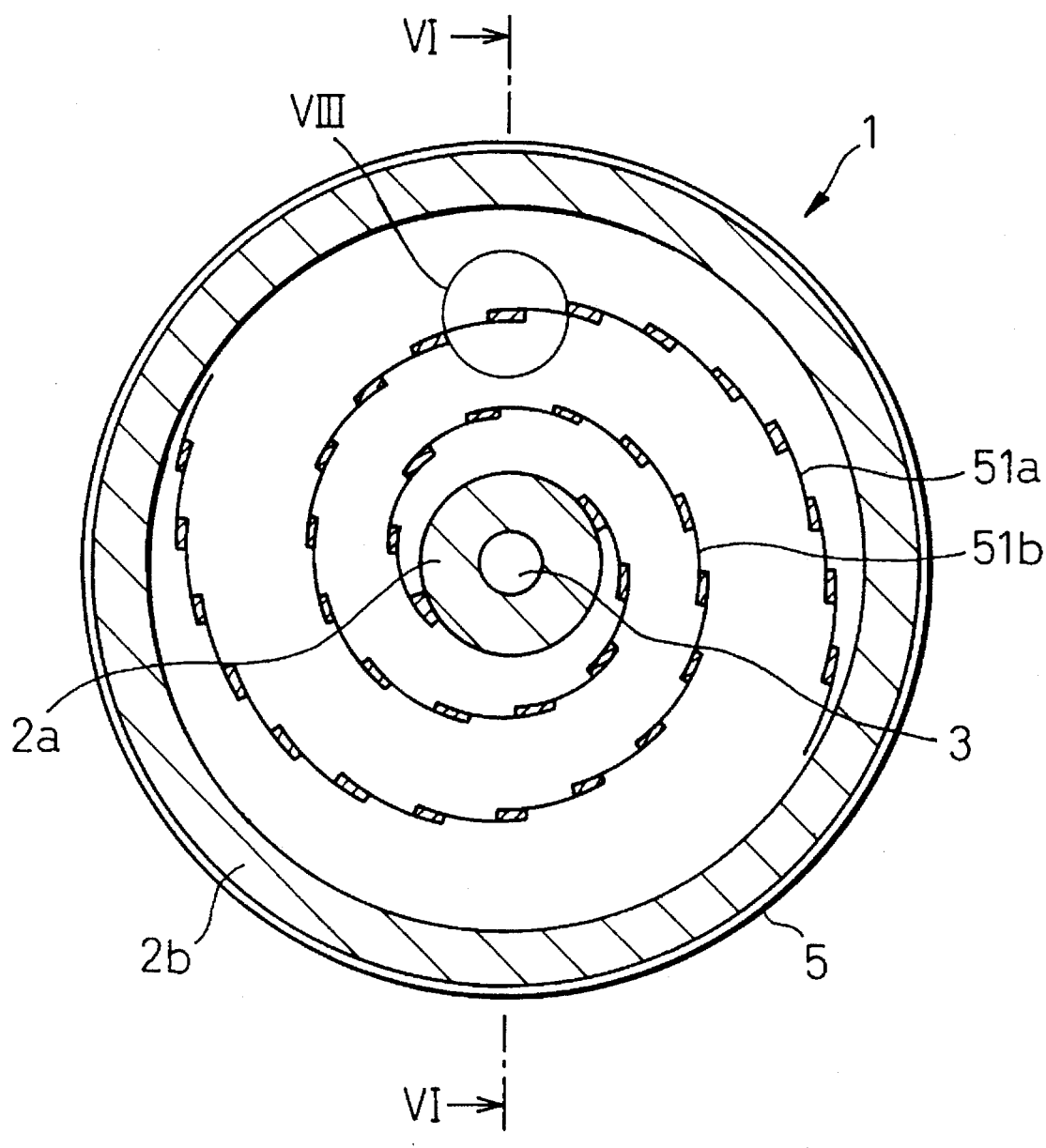
FIG. 5 is a drawing showing electric paths formed in the laminated assembly according to an embodiment of the present invention.

In this embodiment, the local conductive connections are formed on the exhaust inlet side end face 2d of the laminated assembly 2 in such a manner that the local conductive connections are arranged in double spirals or electric paths 51a and 51b as shown in FIG. 5. At the respective local conductive connections, the plain metal sheet 10 and the corrugated metal sheet 20 are joined over the depth from the end face 2d equal to the width d (FIG. 4) of the solder foils 41. The region around the center electrode 3 and the region adjacent to the outer electrode 5 are the regions where the thin metal sheets 10 and 20 in the respective layers are joined along the entire length of the metal sheets, so that annular conductive zones 2a and 2b are formed.

Figure 6:
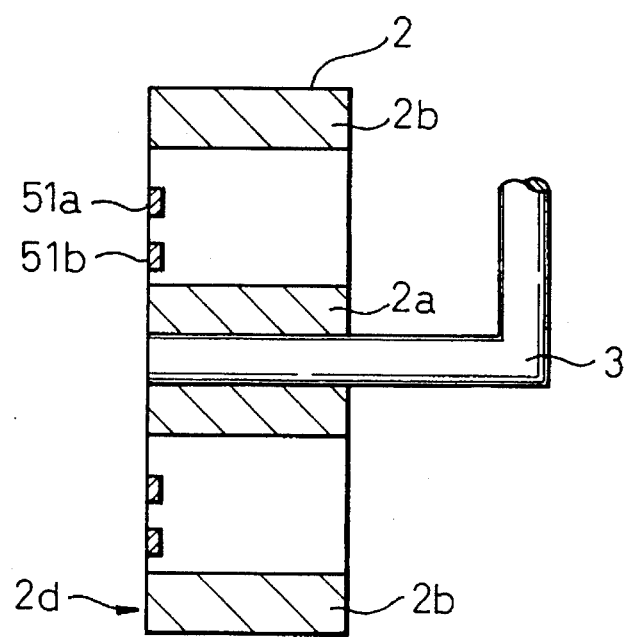
FIG. 6 shows a section of the laminated assembly taken along the line VI—VI in FIG. 5.

FIG. 6 shows a section along the line VI—VI in FIG. 5. In FIG. 5, the hatched portions indicate the portions where the thin metal sheets 10 and 20 are connected. As shown in FIG. 6, the plain metal sheet 10 and the corrugated metal sheet 20 are connected over the width of the thin metal sheets (i.e., over the axial length of the laminated assembly) in the annular conductive zones 2a and 2b while the plain metal sheet 10 and the corrugated metal sheet 20 are connected over the depth d (for example, d is 0.5 to 3 mm) from the end face 2d in the local conductive connections between the zones 2a and 2b. Thus, spiral electric paths 51a and 51b having small cross sections and connecting the annular conductive zones 2a and 2b are formed by the local conductive connections.

The annular conductive zones 2a and 2b may be formed by soldering the plain metal sheet 10 and the corrugated metal sheet 20 using the solder foils containing a zirconium component in a similar manner as shown in FIG. 4. However in this embodiment, the annular conductive zones 2a and 2b are formed by the process illustrated in FIG. 7.

Figure 7:
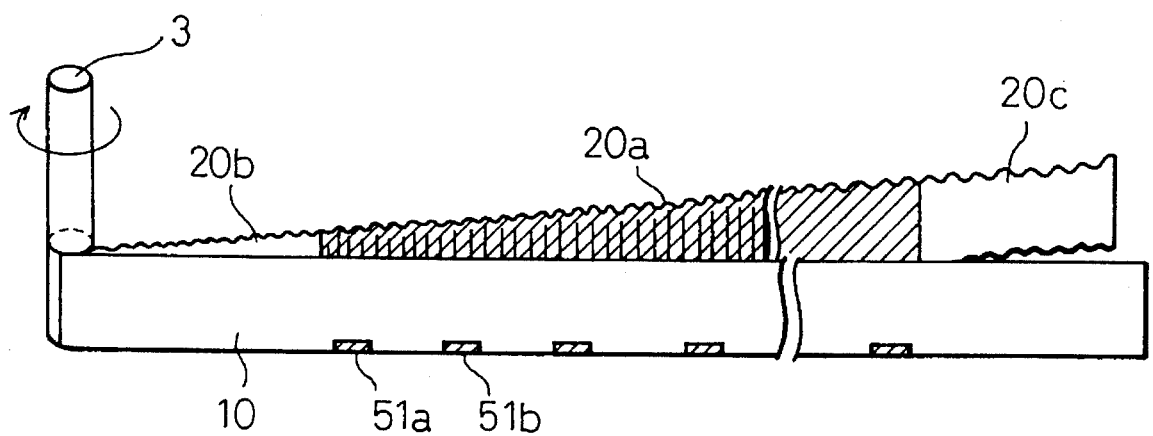
FIG. 7 is a drawing illustrating the method for forming the conductive zones in FIG. 5.

As shown in FIG. 7, the corrugated metal sheet 20 in this embodiment is formed as a compound metal sheet which is consist of a corrugated insulated metal sheet 20a and corrugated raw metal sheets 20b and 20c, connected to both longitudinal ends of the corrugated insulated metal sheet 20a. The raw metal sheet section 20b is connected to the center electrode 3, and a slurry of soldering material containing a nickel component is applied to the surfaces of the raw metal sheet sections 20b and 20c. Then, the plain raw metal sheet 10 is laminated on the compound corrugated metal sheet 20, and the metal sheets 10 and 20 are together wound around the center electrode 3. Therefore, when the scroll-like laminated assembly is formed, the compound corrugated metal sheet 20 and the plain raw metal sheet 10 in the annular conductive zones 2a and 2b are laminated via a layer of soldering material containing a nickel component. Therefore, when the whole laminated assembly is heated, the raw metal surfaces of the compound corrugated metal sheet 20 and the plain metal sheet 10 in the annular conductive zones 2a and 2b are soldered by the nickel solder. Therefore, the raw metal sections of the corrugated metal sheet 20 and the plain raw metal sheet 10 are directly soldered in the zones 2a and 2b. Since the bare metal surfaces are soldered without interposing the insulating coating in the conductive zones 2a and 2b, the junction strength between the metal sheets 10 and 20 is increased.

Further, though the local conductive connections in the electric paths 51a and 51b are formed by connecting the plain metal sheet (raw metal sheet) 10 and the corrugated metal sheet (insulated metal sheet) 20 using only the zirconium solder foils 41, compound solder foils in which nickel solder foils and zirconium solder foils are laminated may be used. In this case, the nickel solder foils are placed on the plain metal sheet (raw metal sheet) 10 side and the zirconium solder foils are placed on the corrugated metal sheet (insulated metal sheet) 20 side. Since the nickel solder has good affinity with both the zirconium solder and the material of the raw metal sheet, by using the compound solder foils, larger junction strength between the plain metal sheet 10 and the corrugated metal sheet 20 can be obtained.

Figure 8:
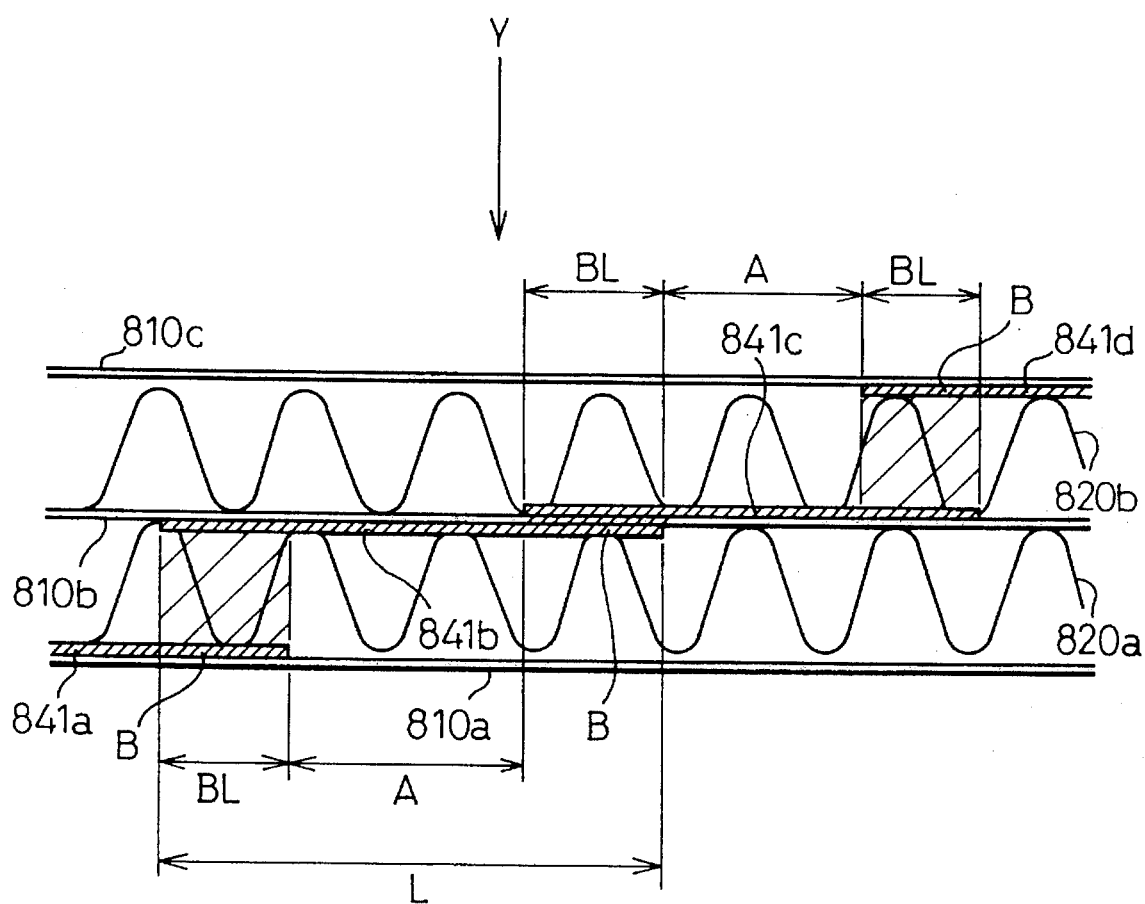
FIG. 8 is a drawing illustrating the arrangement of the local conductive connections in the electric paths in FIG. 5.

FIG. 8 is an enlarged view of the portion VIII in FIG. 5 which shows the detail of the local conductive connections in the electric paths 51a and 51b. In FIG. 8, 810a, 810b and 810c are portions of the plain metal sheet 10 in the laminated assembly 2, 820a, and 820b are portions of the corrugated metal sheet 20 in the laminated assembly. Between the plain metal sheet 10 and the corrugated metal sheet 20, zirconium solder foils 841a through 841d are interposed. Each of the zirconium solder foils 841a through 841d is 0.5 to 3 mm wide (i.e., the length in the direction along the axis of the laminated assembly is 0.5 to 3 mm). The length of each foils is about 6 to 7 times of the interval of the crests (in FIG. 8, for the purpose of illustration, the lengths of the foils 841a through 841d are shown much shorter than actual). In this embodiment, the intervals between the crests of the corrugated metal sheet 10 is about 2 to 3 mm. Therefore, the actual length L of the zirconium solder foils 841a through 841d is 12 to 20 mm each.

As shown in FIG. 8, the solder foils in the respective layers are disposed in such a manner that the solder foil in one layer is shifted in the direction along the metal sheet relative to the solder foil in the adjoining layers. Namely, the solder foil in one layer (for example, 841b) and the solder foils in the adjoining layers (841a and 841c) overlap only at their longitudinal end portions. Further, the length of the overlapped portions of the respective solder foils (indicated by the length BL in FIG. 8) is less than half of the length L of the solder foils (BL<L/2). Namely, the solder foils in the respective layers are offset from the solder foils in the adjoining layers by the length (L–BL). Since the overlap length BL is less than half of the length L, the respective solder foils have portions overlapping the solder foils in the adjoining layers, but have no portions overlapping the solder foils in layers next to the adjoining layers. For example, in FIG. 8, the solder foil 841b overlaps the solder foils 841a and 841c by the portions B, viewed from the direction perpendicular to the layers (indicated by arrow Y in FIG. 8), but does not overlap the solder foil 841d in the layer next to the adjoining solder foil 841c. Namely, when viewed from the direction perpendicular to the layers, a clearance equal to the length A in FIG. 8 is formed between the solder foil 841b and 841d. This is true for other solder foils.

By offsetting the respective solder foils relative to the solder foils in the adjoining layers in the manner explained above, the local conductive connections formed by the solder foils are arranged in spiral on the exhaust inlet side end face 2d of the laminated assembly 2 and, thereby, the spiral electric paths 51a and 51b are formed.

In the spiral electric paths 51a and 51b, electric current flows, for example, from the plain metal sheet 810a (FIG. 8) to the corrugated metal sheet 820a through the solder foil 841a, and from the corrugated metal sheet 820a to the plain metal sheet 810b through the solder foil 841b. Between the plain metal sheets 810a and 810b, electricity flows through the shortest path in corrugated metal sheet 820a, namely the hatched portion of corrugated metal sheet 820a in FIG. 8. Therefore, electricity concentrates in the overlapped portion B of the solder foils 841a and 841b, thus a heat spot is formed in this portion. Further, since the heat spots in the respective layers are offset from each other, electricity flows through the plain metal sheets between the heat spots (i.e., in the circumferential direction in the laminated assembly 2). Therefore, the total length of the electric path between the electrodes becomes large and thus a relatively large resistance can be obtained. Namely, by arranging the local conductive connections in the manner explained above, the intensities of electric current in the heat spots (hatched area in FIG. 8) are increased while the increase in the total amount of electric current is suppressed.

Further, since the length BL of the overlapped portions B of the solder foils is less than half of the length of the solder foils, heat spots in the adjoining layers never overlap each other. Therefore, electricity always flows through the plain metal sheet between the heat spot, i.e., short circuits between the heat spots are never formed.

In the local conductive connections in FIG. 8, the junction strengths between the metal sheets are determined by the area (L×d) of the solder foils, and the resistance of the heat spots is determined by the area (BL×d). As explained above, the length BL is smaller than the length L. Therefore, the junction strength between the metal sheets can be increased by setting the length L large while keeping the resistance between the layers at an appropriate value by setting the length BL small. This means that the structural strength of the laminated assembly can be increased while keeping the amount of electric current at an appropriate value in this embodiment.

Figure 9A:
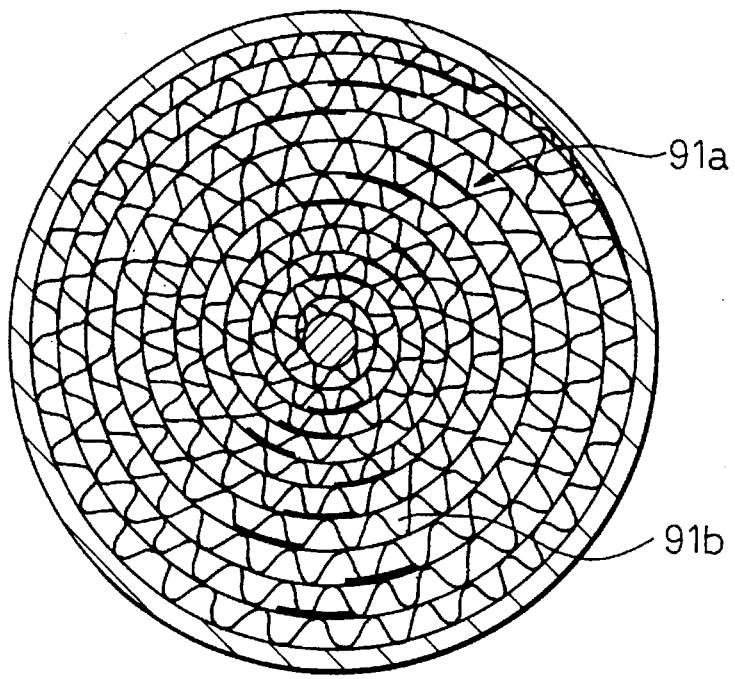
FIG. 9A is a drawing showing electric paths formed in the laminated assembly according to another embodiment of the present invention.
Figure 9B:
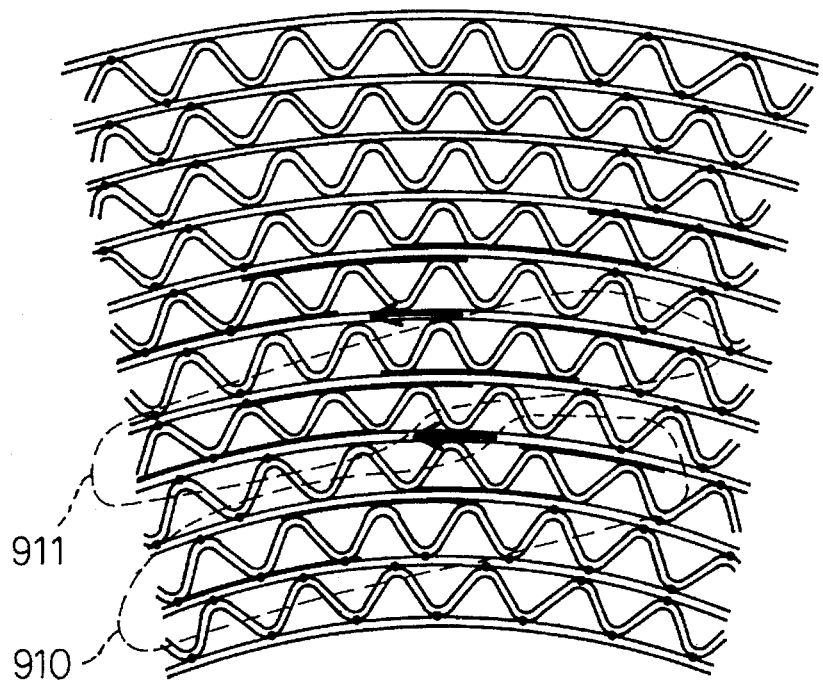
FIG. 9B is a drawing illustrating the arrangement of the local conductive connections in the electric paths in FIG. 9A.

In the above embodiment, spiral electric paths $51a$ and $51b$ are formed by local conductive connections. However, the shapes of the electric paths do not need to be spiral. For example, as shown in FIG. 9A, the local conductive connections may be disposed in a zigzag pattern to form electric paths $91a$ and $91b$. FIG. 9B shows an enlarged view of the local conductive connections in FIG. 9A. As seen from FIG. 9B, the local conductive connections in the successive three layers form a unit in which the local conductive connections are arranged in such a manner that only portions of the solder foils overlap each other, and these units of three local conductive connections are aligned in radial directions. In this case, electric current flows through the metal sheet, in the circumferential direction between the units of the local conductive connections (for example, units 910 and 911 in FIG. 9B), as shown by arrows in FIG. 9B. Therefore the length of the electric paths becomes longer than that of the spiral electric paths in FIG. 5 and the number of the local conductive connections can be increased to further improve the structural strength of the laminated assembly 2 while keeping the amount of electricity used at the same level as that of the embodiment in FIG. 5.

Figure 10A:
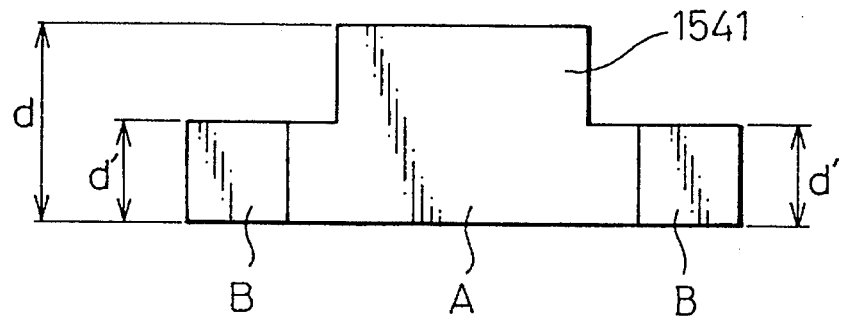
FIGS. 10A and 10B are drawings showing an example of the shape of a solder foil and conductive connections formed by the solder foils.

Next, another embodiment of the present invention is explained with reference to FIGS. 10A and 10B. FIG. 10A shows an example of the shape of the solder foils 1541 used in this embodiment. In this embodiment, the solder foils 1541 are disposed in the respective layers in the same manner as the solder foils 841a through 841d in FIG. 8. However, though the solder foils in FIG. 8 have uniform widths d (FIG. 4), the solder foils 1541 in this embodiment have portions having different widths. Namely, the both end portions of the solder foils 1541 which overlap the solder foils in the adjoining layers (indicated by B in FIG. 10A) have widths d' smaller than the widths d of other portions (indicated by A in FIG. 10B) which do not overlap the solder foils in the adjoining layers.

Figure 10B:
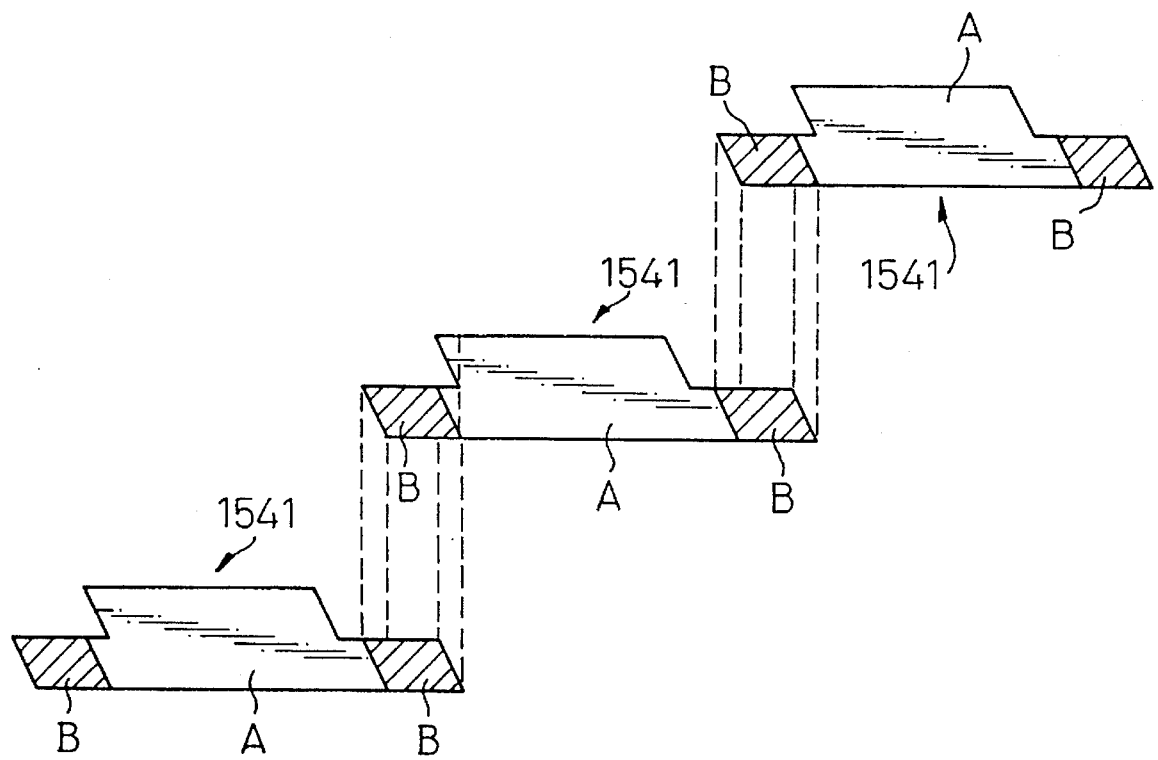

FIG. 10B shows the relative position Of the solder foils 1541 in adjoining two layers of the laminated assembly, the metal sheets 10 and 20 are not shown for clarity. As shown in FIG. 10B, the solder foils in this embodiment overlap the solder foils in the adjoining layers only at the portions B having smaller widths, when viewed from the direction perpendicular to the metal sheets. As explained before, when electricity is fed to the laminated assembly, electric current flows to the direction perpendicular to the layers through the overlapped portions B, thereby the overlapped portions B become heat spots. The intensity of electric current flowing through the overlapped portions increases as the area of the overlapped portions become smaller. Therefore, by decreasing the widths of the overlapped portions B, the heat generated by the heat spots can be increased. However, if the width of the solder foils are decreased uniformly over the entire length of the solder foils, the junction areas between the metal sheets also decrease and the structural strength of the laminated assembly is lowered. Further, if the widths of the solder foils are decreased uniformly, the widths of electric paths (portion A of solder foils 1541) connecting the respective heat spots (overlapped portions B) also decrease. This may cause excessive increase in the resistance of the electric paths as a whole. Namely, the width of the solder foil must be determined so that it provides sufficient junction areas and appropriate electric resistance while ensuring satisfactory heat generation at the heat spots. It is difficult to satisfy these contradictory requirements if the solder foils have uniform widths.

In this embodiment, since the widths d' of the overlapped portions B of the solder foils 1541 (FIGS. 10A and 10B) can be small regardless of the widths of other portions A (FIGS. 10A and 10B) of the solder foils, the intensity of electric current flowing through the overlapped portion can be increased, thereby heat generated by the heat spots can be increased. On the other hand, the widths of the portions A between the overlapped portions B can be determined regardless of the widths of the overlapped portions B, the junction strength between the thin metal sheets can be increased, and the electric resistance between the heat spots can be set to an appropriate value.

Since the electric current flows through the corrugated metal sheet 20 in the direction perpendicular to the layers in the heat spot (indicated by hatched portions in FIG. 8), the heat generated by the heat spots can be further increased by reducing the thickness of the corrugated metal sheet 20. Namely, by forming the laminated assembly using corrugated metal sheet thinner than plain metal sheet (for example, a corrugated metal sheet having 30 microns thickness may be used in combination with the plain metal sheet having a normal 50 microns thickness), the heat generated at the heat spots can be increased.

Figure 11A:
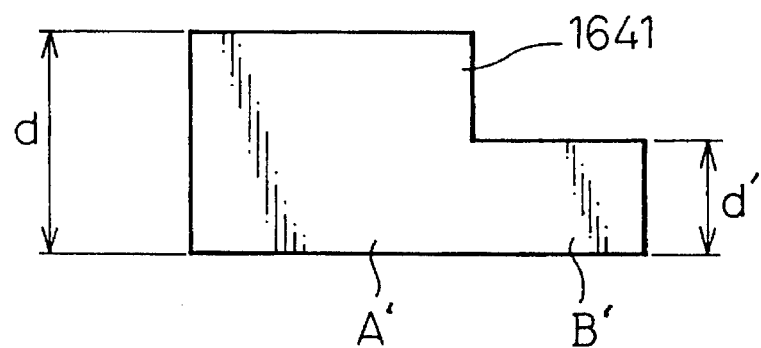
FIGS. 11A and 11B are drawings showing another example of the shaped of a solder foil and conductive connections formed by the solder foils.
Figure 11B:
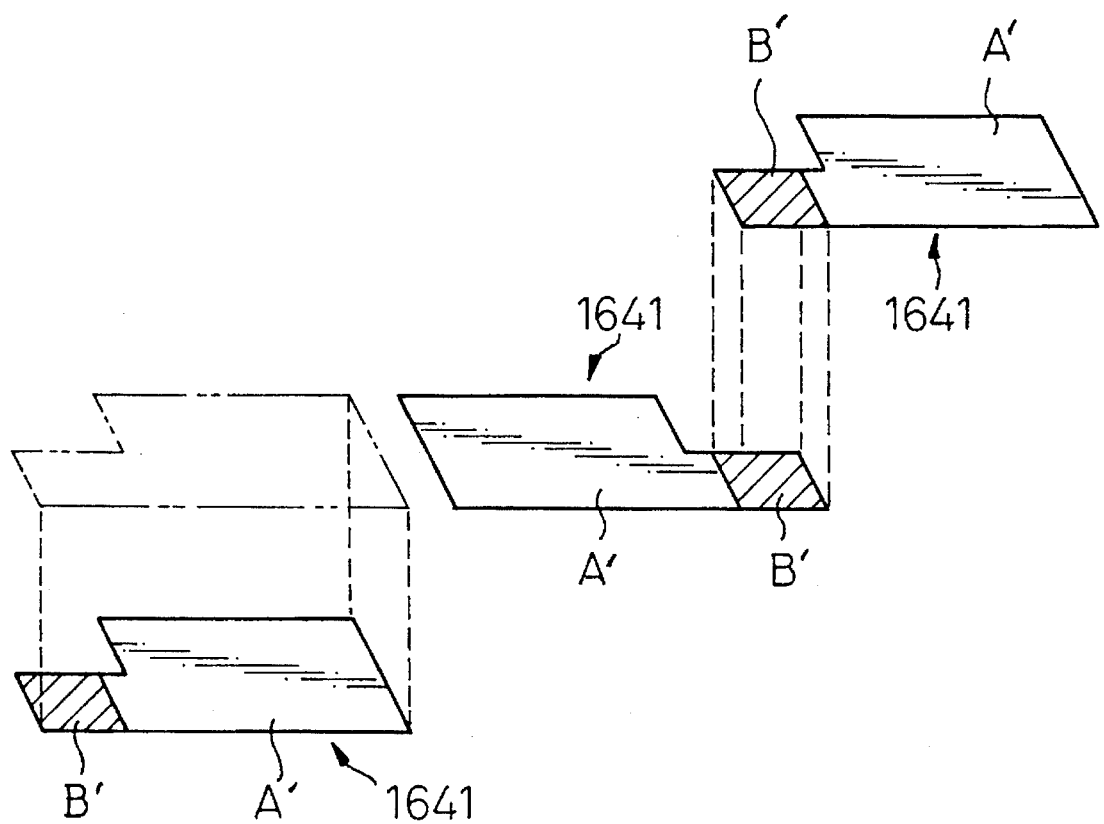
Figure 12:
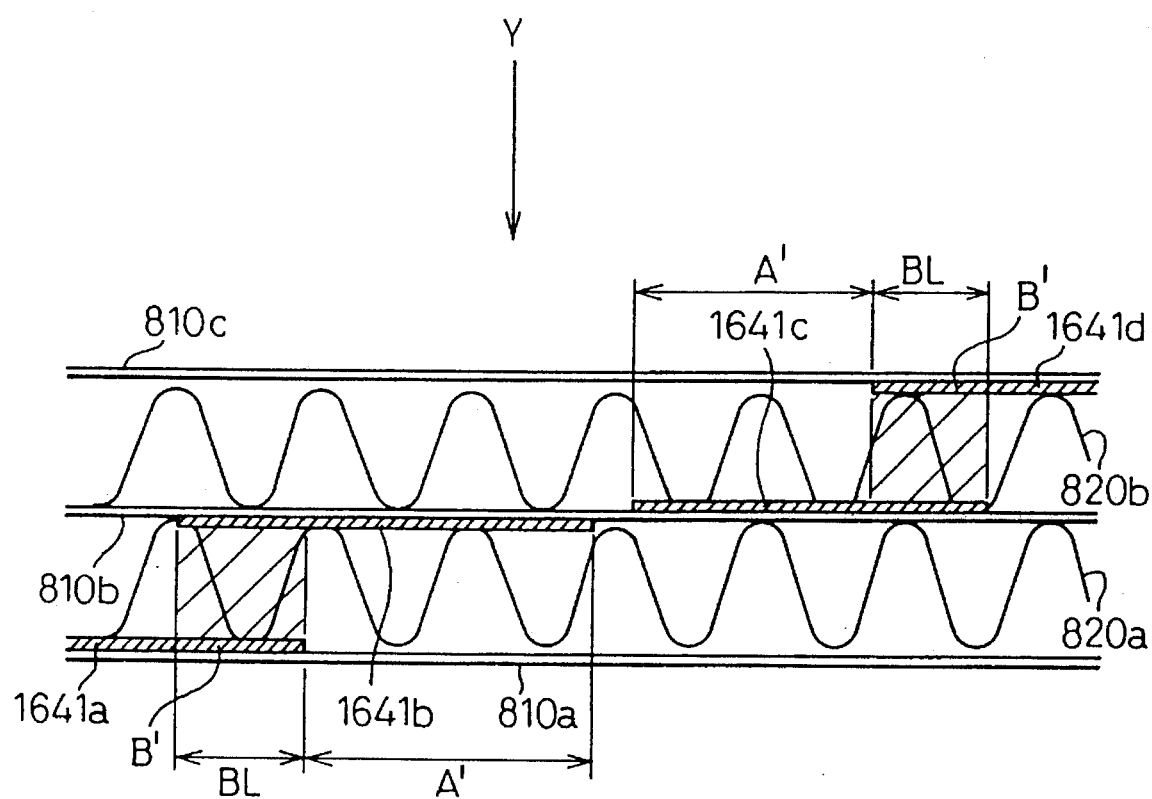
FIG. 12 is a drawing illustrating the arrangement of the local conductive connections formed by the solder foils in FIGS. 11A and 11B.

FIGS. 11A, 11B and 12 show another embodiment of the present invention. FIGS. 11A and 11B are drawings similar to FIGS. 10A and 10B which illustrate the shape of the solder foils used in this embodiment. As shown in FIGS. 11A, the solder foils 1641 in this embodiment also have portions having different widths. However, the solder foil 1641 has a portions B' having a narrower width d' only at one end thereof. The other end portion A' has a width d larger than the width d' of the portion B'. FIG. 11B shows the relative position of the solder foils 1641 in the respective layers. As shown in FIG. 11B, a solder foil in one layer overlaps the solder foil in only one of the adjoining layer at the narrow portion B', in this embodiment. The other portion A' of the solder foil 1641 does not overlaps with the solder foil in the adjoining layers. FIG. 12 is a drawing similar to FIG. 8 which shows the arrangement of the solder foils in the respective layers in this embodiment. As shown in FIG. 12, only solder foils 1641a and 1641b (1641c and 1641d) disposed on the both sides of the corrugated metal sheets 820a (820b) overlap each other by the end portions B' having narrower width d'. Namely, the folder foils 1641b and 1641c disposed on both sides of the plain metal sheets 810b have no overlapped portions. As explained above, since the overlapped portions B' of the solder foils 1641 have narrow width d', heat spots are formed by the portions of corrugated metal sheets between the overlapped portions B' of the solder foils. Since the portions A' of the solder foils on the both sides of the plain metal sheets do not overlap each other, electric current flows through the plain metal sheets between the conductive connections in this embodiment. However, since the width d' of the overlapped portions B' of the solder foils 1641 can be formed small regardless of the widths of other portions A', the intensities of electric current flowing through the overlapped portions can be increased. Further, the widths of the portions A' can be determined regardless of the widths of the overlapped portions B'. Therefore, the junction strength between the thin metal sheets can be increased and the electric resistance between the heat spots can be adjusted to an appropriate value in this embodiment as well.

Though only the portions B' of the solder foils 1641 having narrower width d' overlap with the solder foils in the adjoining layers in this embodiment, the solder foils may be arranged in such a manner that the end portions A' of the solder foils 1641 also overlap with the portions A' of the solder foils in the adjoining layers. In this case, the respective solder foils overlap with the solder foils in both adjoining layers by the end portions, i.e., the end portion A' of the respective solder foils overlaps the end portion A' of the solder foil in one of the adjoining layer and the end portion B' of the respective solder foils overlap with the end portion B' of the solder foil in the other adjoining layer.

Figure 13A:
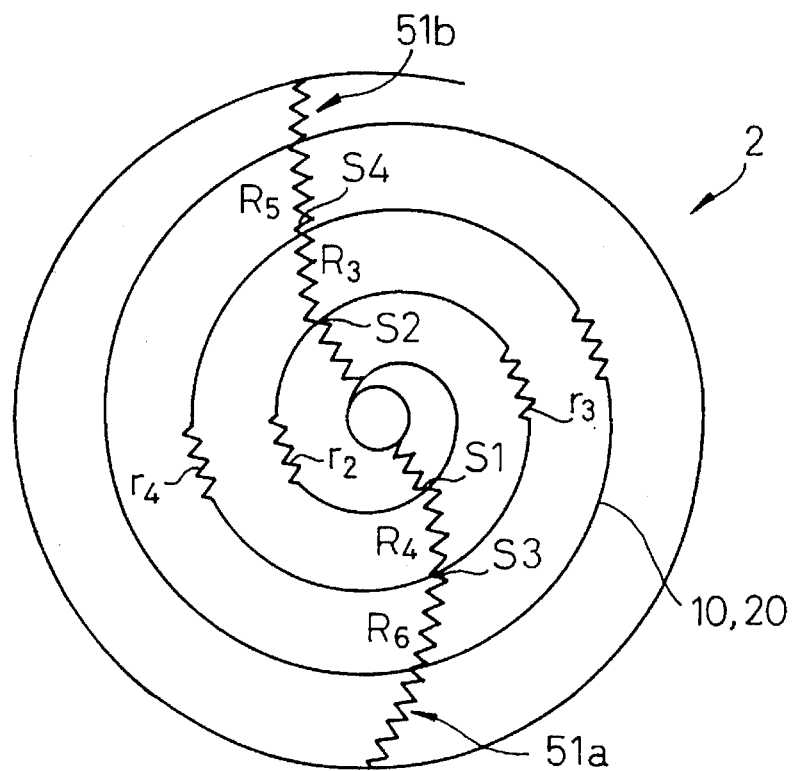
FIGS. 13A and 13B are drawings explaining an equivalent electric circuit of the electric paths according to an embodiment of the present invention.

FIG. 13A schematically shows the electric circuit formed in the laminated assembly 2 by the local conductive connections in FIG. 5. In FIG. 13A, r designates the resistance of the sections of the thin metal sheets 10 and 20 between the local conductive connections, R designates the resistance of the spiral electric paths 51a and 51b formed by the local conductive connections. S1 and S3 in FIG. 13A designate the points in the electric path 51a on two thin metal sheets in the adjoining layers. The points S1 and S3, are connected by a heat spot having resistance $R_4$. Similarly, S2 and S4 in FIG. 13A designate points in the electric paths 51b on two thin metal sheets in the adjoining layers. The points S2 and S4 are connected by a heat spot having resistance $R_3$. As seen from FIG. 13A, the points S1 through S4 are also connected electrically through the thin metal sheets. In FIG. 13A, $r_2$ designates resistance of the section of thin metal sheets connecting the points S1 and S2. Similarly, $r_3$ and $r_4$ designate resistance of the sections of the thin metal sheets connecting the points S2 and S3, S3 and S4, respectively.

Figure 13B:
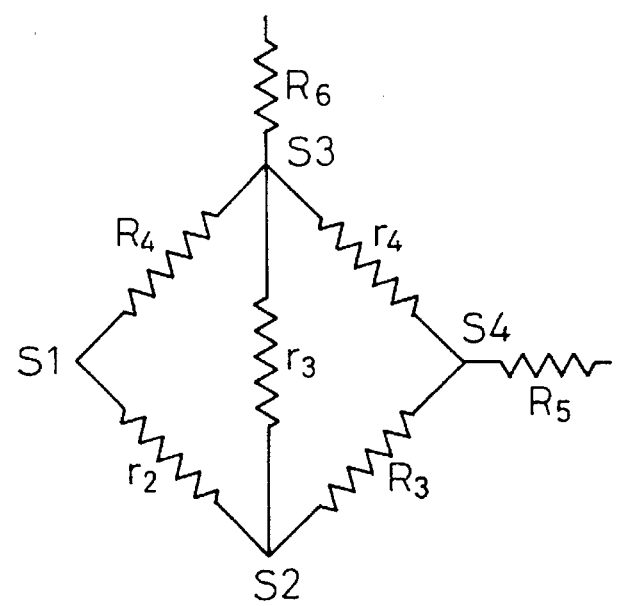

FIG. 13B shows the equivalent electric circuit of the electric paths connecting the points S1 through S4 in FIG. 13A. As seen from FIG. 13B, the resistance $R_4$ of the heat spot must be smaller than the resistance $r_2$ of the section of the thin metal sheets between the points S1 and S2 in order to cause a major portion of the electric current to flow through the heat spot having resistance $R_4$. Further, in order to cause a major portion of the electric current to flow from the point S3 to the next heat spot having resistance $R_6$ (FIG. 13A), the resistance $R_6$ of the heat spot must be smaller than the resistance $r_4$ of the section of the metal sheets between the points S3 and S4. Namely the values of the resistance $r_2$ and $R_4$ must be $r_2 \gg R_4$, and the values of the resistance $r_4$ and $R_6$ must be $r_4 \gg R_6$. Similarly, in order to cause a major portion of the electric current to flow through the heat spot having resistance $R_3$ and to flow into the next heat spot having resistance $R_5$, the relationships $r_3 \gg R_3$ and $r_4 \gg R_5$ must be satisfied.

As explained before, the resistance R of the respective heat spots are preferably large in order to obtain a sufficient amount of the heat at the heat spots. However, if the resistance R of the heat spots are excessively large, the amount of the electric current flowing through the heat spots decreases since the relationship $r \gg R$ is not satisfied and a major portion of the electric current flows through the sections of the thin metal sheets between the local conductive connections. However, in the embodiments explained above, the resistance R of the respective heat spots can be adjusted easily by changing the areas of the solder foil overlapping the solder foils in the adjoining layers. Therefore, the resistance of the respective heat spots can be easily adjusted to an appropriate value while maintaining the relationship $r \gg R$.

Further, though the thin metal sheets in the embodiments explained above are joined to each other only by the local conductive connections, the thin metal sheets may be joined by an adhesive having an insulating capability, in addition, to the local conductive connections formed by the solder foils. By joining the thin metal sheets using the insulating adhesive, the structural strength of the laminated assembly can be further increased while keeping the resistance of the electric paths formed by the local conductive connections at the same value as the embodiments explained above. If the thin metal sheets near the exhaust outlet side of the laminated assembly only are joined by the insulating adhesive, an increase in the heat capacity of the portion of the laminated assembly near the exhaust inlet side can be avoided and the time required for heat up the laminated assembly is not affected by the insulating adhesive.

Next, another embodiments of the present invention is explained with reference to FIGS. 14A and 14B.

In this embodiment, the local conductive connections 121 between the layers are formed on the exhaust inlet side end face 2d of the laminated assembly in the same manner as explained in FIGS. 4 through 12. However, local conductive connections 122, in addition to the local conductive connections 121, are formed in the layers near the exhaust outlet side end face 2e of the laminated assembly. The local conductive connections 122 are also formed by joining the thin metal sheets using zirconium solder foils. The purpose of the local conductive connections 122 near the exhaust side end face 2e not to form heat spots but to increase the structural strength of the laminated assembly 2 by increasing junction areas between the thin metal sheets. Therefore, the local conductive connections 122 near the exhaust outlet side end face must be formed in such a manner that they do not significantly reduce the resistance of the electric paths between the electrodes while ensuring large junction areas between the thin metal sheets.

To satisfy the above requirement, the local conductive connections 122 near the exhaust outlet side end face are disposed at intervals larger than the local conductive connections 121 on the exhaust inlet side end face. FIG. 14A shows the arrangement of the local conductive connections 121 and 122 viewed from the direction along the axis of the laminated assembly 2. As seen from FIG. 14A, the local conductive connections 122 near the exhaust outlet side end face are disposed at intervals of several layers while the local conductive connections 121 are disposed in each layer. Since the electric paths formed by the thin metal sheets between the local conductive connections 122 are much longer than the electric paths formed by the thin metal sheets between the local conductive connections 121, the resistance between the local conductive connections 122 is substantially larger than the local conductive connections 121.

Therefore, when electricity is fed to the laminated assembly 2, a major portion of electric current flows through the electric paths formed by the local conductive connections 121 on the exhaust inlet side end face, and only a very small portion of electric current flows through the electric paths formed by the local conductive connections 122 near the exhaust outlet side end face. Further, since the electric paths having very low resistance formed by the local conductive connections 121 and the electric paths having large resistance formed by the local conductive connections 122 are connected in parallel, the resistance between the electrodes as a whole becomes slightly smaller than the resistance of the electric paths formed by the local conductive connections 121, thus the resistance between the electrodes as a whole is not largely lowered. Therefore, by disposing the local conductive connections 122 at larger radial intervals than the local conductive connections 121, the structural strength of the laminated assembly 2 can be increased without lowering the resistance between the electrodes.

Figure 14A:
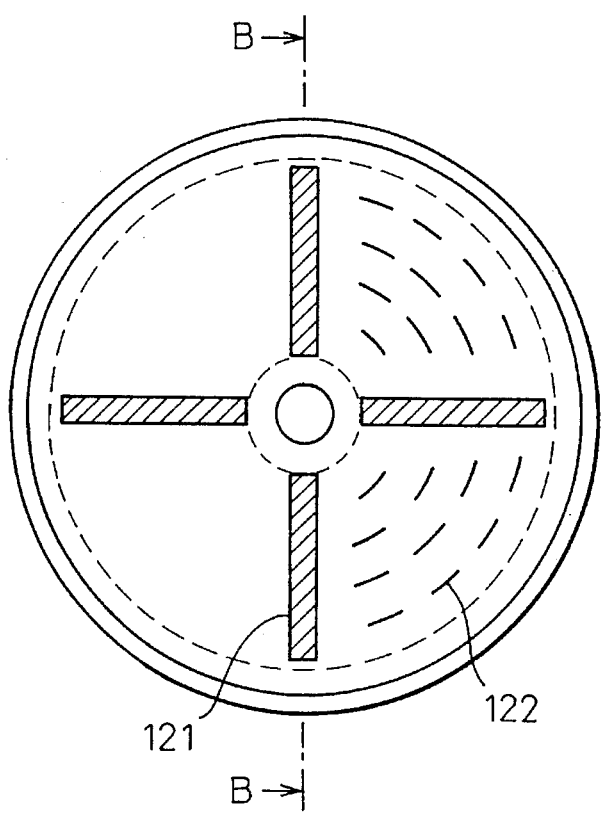
FIGS. 14A and 14B are drawings illustrating the arrangement of the local conductive connections in the laminated assembly according to another embodiment of the present invention.
Figure 14B:
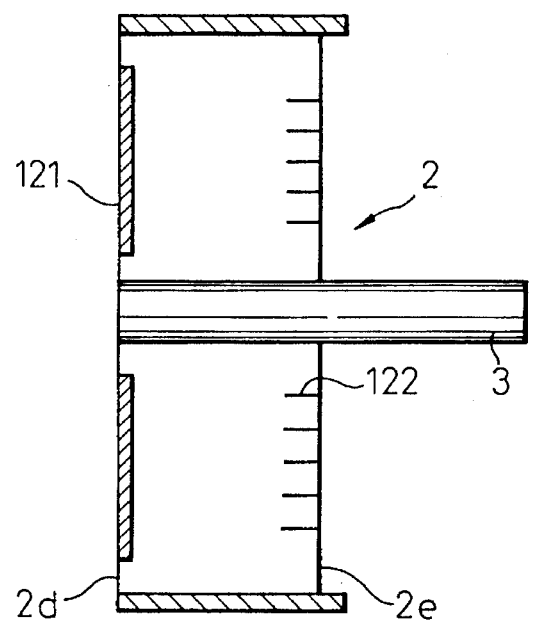

FIG. 14B shows the section of the laminated assembly along the line B—B in FIG. 14A. As shown in FIG. 14B, the width (i.e., the length along the axis of laminated assembly) of the local conductive connections 122 near the exhaust outlet side end face is set larger than the width of the local conductive connections 121 within the extent that the resistance of the electric paths formed by the local conductive connections 122 do not decrease largely. Therefore, the junction area between the thin metal sheets, i.e., the structural strength of the laminated assembly is further increased.

Next, another embodiment is explained with reference to FIGS. 15A, 15B and 15C. In the embodiments explained before, the local conductive connections are formed by soldering the raw metal sheets 10 and the insulated metal sheet 20 by zirconium solder foils. However, the junction strength of the connections formed by soldering a surface coated by the insulating coating and a bare metal surface is lower than the strength of the connections formed by soldering bare metal surfaces. Therefore, a larger junction area is required to maintain the structural strength of the laminated assembly when the insulated metal sheets and the raw metal sheets are soldered. Further, to solder the insulated metal sheet and raw metal sheet, normal soldering material such as nickel solder cannot be used, i.e., relatively expensive zirconium solder must be used. This causes the manufacturing costs of the electrically heated catalytic converter to increase.

In this embodiment, as explained hereinafter, the thin metal sheets are soldered without interposing insulating coatings by normal soldering material such as nickel solder.

Figure 15A:
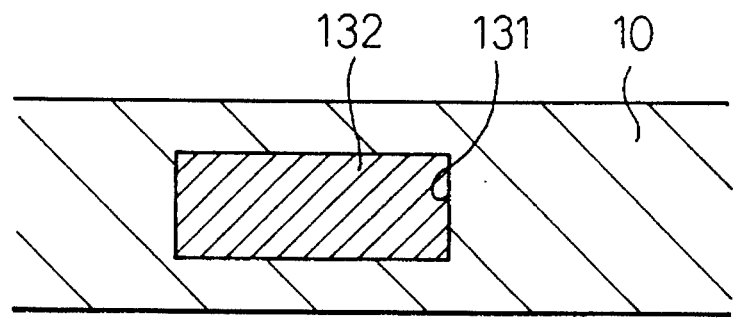
FIGS. 15A, 15B and 15C are the drawings illustrating a process for forming conductive connections formed in accordance with another embodiment of the present invention.
Figure 15B:
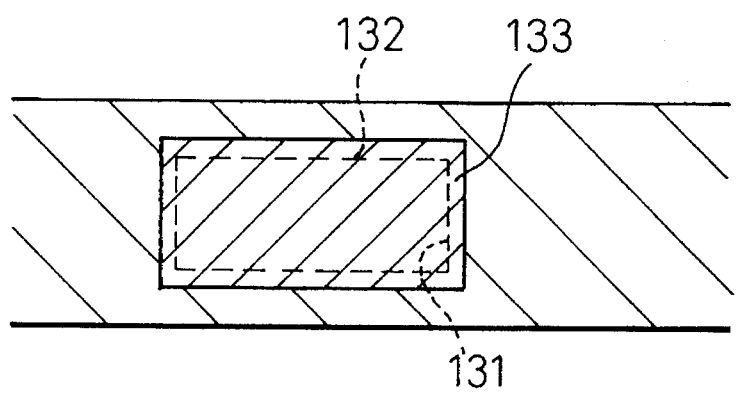
Figure 15C:
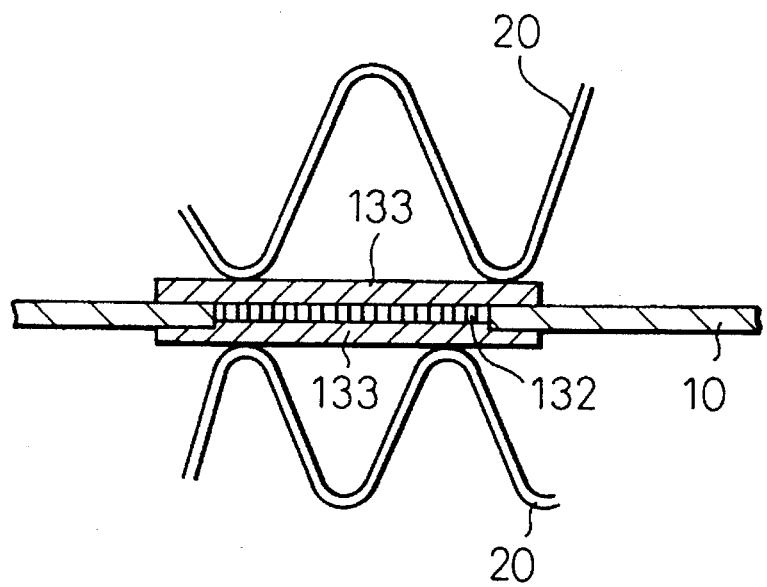

FIGS. 15A, 15B and 15C explain the process for forming the local conductive connections of the present embodiment. Contrary to the embodiments explained above, the plain metal sheet 10 is formed as the insulated metal sheet having insulating coatings, and the corrugated metal sheet 20 is formed as the raw metal sheet having bare metal surfaces. As shown in FIG. 15A, first, apertures 131 of predetermined shapes are cut off on the insulated plain metal sheet 10 at the portions where the local conductive connections are to be formed. Then pieces of the raw metal sheet 132 having complementary shapes to the apertures 131 are inserted into the aperture 131. After fitting the pieces of the raw metal sheet 132 in the apertures 131 in the insulated plain metal sheet, nickel solder foils 133 having slightly larger dimensions than the apertures 131 are press fitted to the both sides of the raw metal sheets 132 in such a manner that the pieces of the raw metal sheets 132 and the portions of the insulated plain metal sheet 10 around the apertures 131 are covered by the nickel solder foils 133. Thus, the pieces of the raw metal sheets 132 are confined in the respective apertures 131 by the nickel solder foils 133 as shown in FIG. 15B.

The insulated plain metal sheet 10 formed by the above explained process is laminated with the corrugated raw metal sheet 20 and together wound around the center electrode to thereby form the laminated assembly 2. In the laminated assembly, the pieces of the raw metal sheet 132 abut the corrugated raw metal sheet 20 via the nickel solder foils 133 at the portions where the local conductive connections are to be formed as shown in FIG. 15C. Therefore, when the whole laminated assembly is heated, the pieces of the raw metal sheet 132 and the corrugated metal sheet 20, as well as the pieces of the raw metal sheet 132 and the edges of the aperture in the plain metal sheet 10 are soldered by the nickel solder foils 133, respectively.

In this embodiment, the dimensions of the respective pieces of the raw metal sheet 132 are determined in such a manner that the pieces 132 are soldered to two to three crests of the corrugated metal sheet 20 by widths of about 2 mm, (i.e., the pieces 132 are typically 0.5 to 3 mm wide and 5 to 6 mm long).

As explained above, according to the present embodiment, the local conductive connections are formed by soldering the bare metal surfaces of the raw metal sheets 132 and the corrugated metal sheets 20. Therefore, the junction strength between the metal sheets becomes larger than that of the previous embodiments. Further, since normal nickel solders can be used for soldering, the cost for manufacturing the electrically heated catalytic converter can be lowered.

We claim:

1. An electrically heated catalytic converter for an engine comprising:
    (a) a substrate supporting a three-way reducing and oxidizing catalyst, the substrate including a laminated assembly of layers, each layer having:
        (1) a plain metal sheet,
        (2) a corrugated metal sheet,
        (3) a thin insulating layer interposed between said plain metal sheet and said corrugated sheet, the thin insulating layers being made of an oxide of a first metal, and
        (4) a local conductive connection including strips of solder foil which electrically connect the plain metal sheet in said each layer to the corrugated metal sheet in said each layer through the thin insulating layer, and electrically connect the plain metal sheet in said each layer to the corrugated metal sheet in the layer adjoining said each layer through the thin insulating layer, said strip of solder foil being made of a soldering material containing a second metal having a larger reducing capability than said first metal, wherein said strips of solder foil are arranged in such a manner that the strips of solder foil disposed on both sides of the corrugated metal sheet overlap each other by only a portion when viewed from a direction perpendicular to said each layer;
    (b) a first electrode, wherein said laminated assembly of layers includes an inside layer electrically connected to the first electrode; and
    (c) a second electrode, wherein said laminated assembly of layers includes an outside layer electrically connected to the second electrode.

2. An electrically heated catalytic converter according to claim 1, wherein said strips of solder foil disposed on the corrugated metal sheet in said each layer overlap with the strips of solder foil connecting the plain metal sheet of said each layer and the corrugated sheet of the adjoining layer at end portions of the strips and in such a manner that the strips of solder foil disposed on the corrugated metal sheet in said each layer and the strips of solder foil connecting the plain metal sheet and the corrugated sheet of the adjoining layer are separated by a predetermined clearance as viewed from the direction perpendicular to said layers.

3. An electrically heated catalytic converter according to claim 1, wherein the width of each of said strips of solder foil is narrower at the overlapped portion than the width of other portions of the strips.

4. An electrically heated catalytic converter according to claim 2, wherein the width of each of said strips of solder foil is narrower at the overlapped portion than the width of other portions of the strips.

5. An electrically heated catalytic converter for an engine comprising:

- (a) a substrate supporting a three-way reducing and oxidizing catalyst, the substrate including a laminated assembly of layers, each layer having:
  - (1) a plain metal sheet,
  - (2) a corrugated metal sheet,
  - (3) a thin insulating layer interposed between said plain metal sheet and said corrugated sheet, the thin insulating layers being made of an oxide of a first metal, and
  - (4) an inlet side local conductive connection formed in an exhaust gas inlet portion of said laminated assembly and electrically connecting the plain metal sheet of said each layer to the plain metal sheet of the adjoining layer through said thin insulating layer, and
  - (5) an outlet side local conductive connection formed in an exhaust gas outlet portion of said laminated assembly and electrically connecting the plain metal sheet of said each layer to the corrugated metal sheet of the adjoining layer through said thin insulating layer, wherein said outlet side local conductive connection is disposed in such a manner that the distance between said outlet side local conductive connection of said each layer in the direction perpendicular to said each layer is larger than the distance between said inlet side local conductive connection along the direction perpendicular to said each layer;
- (b) a first electrode, wherein said laminated assembly of layers includes an inside layer electrically connected to the first electrode; and
- (c) a second electrode, wherein said laminated assembly of layers includes an outside layer electrically connected to the second electrode.

6. An electrically heated catalytic converter for an engine comprising:

a substrate supporting a three-way reducing and oxidizing catalyst, the substrate being formed as a laminated assembly of thin insulated metal sheets having insulating coatings on their surfaces and thin bare metal sheets having bare metal surfaces alternately, said bare metal sheets further having a first end layer and a second end layer;

a pair of electrodes, a first electrode connected to the first end layer and a second electrode connected to the second end layer; and local conductive connections electrically connecting the insulated metal sheets and adjoining bare metal sheets, wherein each of said local conductive connections is formed by a piece of bare metal sheet fit into an aperture formed on the insulated metal sheet, and solder foils join the bare metal surfaces of said piece of the bare metal sheet and the bare metal surfaces of the bare metal sheets in adjoining layers.

* * * * *